Aug. 22, 1967

C. R. HILPERT 3,336,820

POWER TRANSMISSION

Filed May 4, 1965

INVENTOR
CONRAD R. HILPERT

BY *John W Darley*
ATTORNEY

Aug. 22, 1967    C. R. HILPERT    3,336,820
POWER TRANSMISSION
Filed May 4, 1965    6 Sheets-Sheet 6

FIG. 7.

INVENTOR
CONRAD R. HILPERT
BY
John W Dailey
ATTORNEY

United States Patent Office 3,336,820
Patented Aug. 22, 1967

3,336,820
POWER TRANSMISSION
Conrad R. Hilpert, Winnebago, Ill., assignor to Twin Disc
Clutch Company, Racine, Wis., a corporation of Wisconsin
Filed May 4, 1965, Ser. No. 453,039
14 Claims. (Cl. 74—730)

ABSTRACT OF THE DISCLOSURE

A transmission including hoisting and lowering power trains embodying one or more hydraulically actuated friction clutches and a hydraulically controlled brake wherein the hydraulic pressures are modulatingly controlled during hoisting and lowering.

My invention relates to power transmissions and more particularly to a type that is especially arranged for hoists, cranes and shovels in that provision is made for application of power to the hoisting or digging implements of the associated apparatus during raising and lowering.

For convenience in describing the invention, raising and lowering of the load will be referred to as "power up" and "power down" applications, respectively.

One object of the invention is to provide a transmission of the character indicated in which power up and power down applications are at all times under infinitely smooth, positive control and including a like control during transition from up to down and vice versa.

A further object is the provision of such a transmission in which control is exercised by a single lever and which is further characterized by a fail safe construction that, in the event of failure of the hydraulic control circuitry, will enable a brake to prevent free dropping of the load.

A further object is to provide a transmission as set forth in which the infinitely smooth power up and power down controls of the load are independent of engine speed.

A further object is to provide such a transmission in which the single lever control enables the power input and a brake connected to the transmission output to be so relatively controlled as to accurately position a heavy load at the end of either an up or a down movement.

A further object is the provision of a power transmission including an input controlled slip, power clutch and a hydraulic torque converter arranged in sequential power flow relation, and up and down, controlled slip clutches arranged for selective connection to the converter output to enable smooth transition from up to down and vice versa movements and the application of hydrodynamic braking.

In each of the transmissions described herein, it will be understood that the output shaft would be connected, for example, to the input of a drum or any equivalent unit in a hoisting and lowering apparatus.

Figure 1:
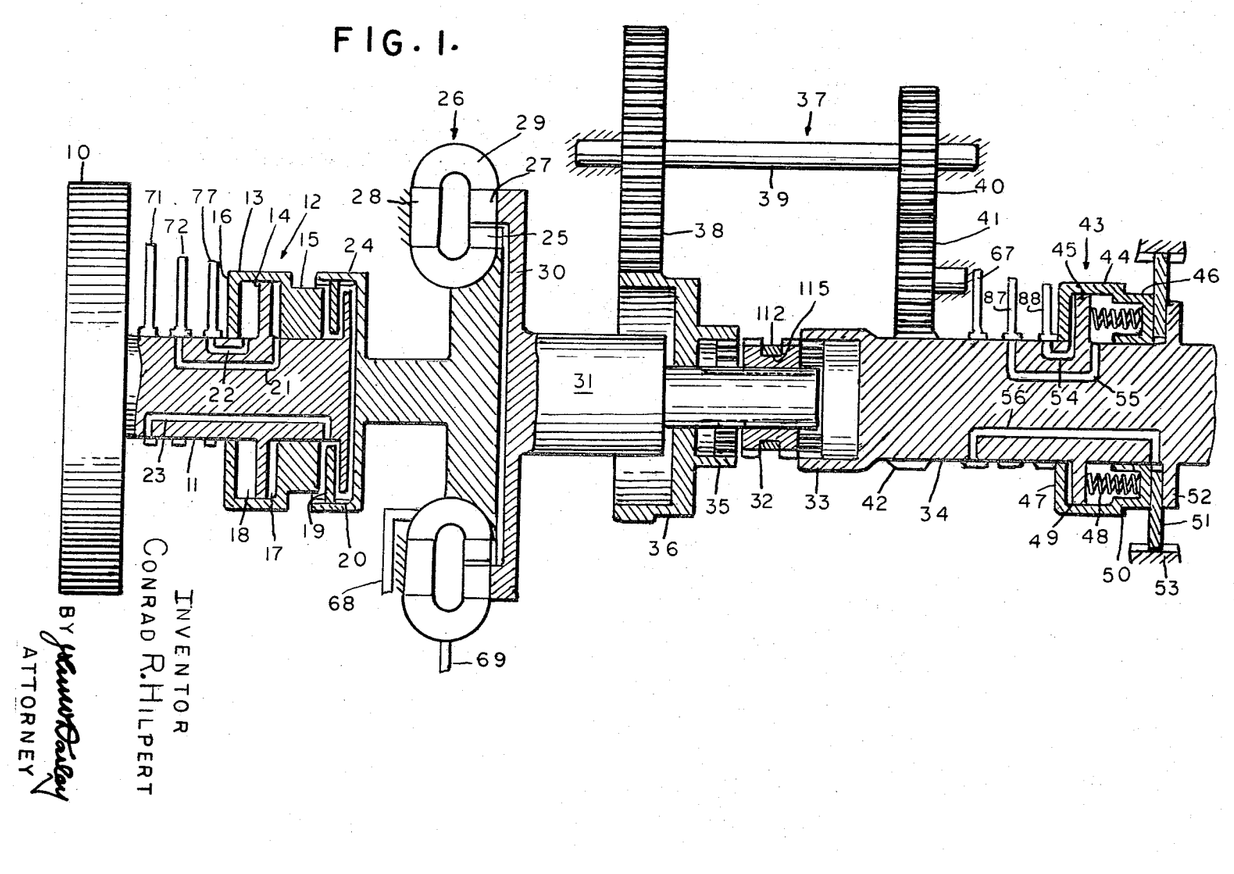
FIG. 1 is a sectional and schematic elevation of one form of the improved transmission which includes a hydraulic torque converter and in which full power is transmitted during power up and power down movements of the load, the input power clutch being shown in release position and the transmission being otherwise conditioned to hold the output shaft thereof stationary.

Referring to FIG. 1 of the drawings, the numeral 10 designates a flywheel as representative of a power input to the transmission and which may be conveniently connected to power source such as an engine or a turbine. The flywheel 10 drivingly connects with an input shaft 11 forming part of an input power clutch 12, hereinafter referred to as the power clutch and shown in release position, which includes an annular casing 13 that surrounds the shaft 11 and an annular reaction member 14 extending laterally from and rotating with the shaft 11. The casing 13 is shiftable axially relative to the shaft 11 and reaction member 14 and is provided with annular end walls 15 and 16 which respectively define with the shaft 11 and reaction member 14 annular apply and balance chambers 17 and 18.

When the circulating medium for the transmission, usually a suitable oil, is supplied under pressure to the apply chamber 17, the casing 13 is shifted to the right to frictionally engage the end wall 15 with the driven clutch plate 19 against an abutment ring 20 fixedly connected to the shaft 11. The number of plates in the clutch 12 is immaterial as long as the primary requirements are satisfied and this factor holds true for all clutches and brakes hereinafter described.

Clutch engaging pressure oil is supplied to the apply chamber 17 under selected and controlled conditions through a passage 21 in the shaft 11 and oil is supplied to the balance chamber 18 through a passage 22 also in the shaft 11, the oil in the latter providing a conventional means of balancing the centrifugal head developed in the apply chamber 17. Cooling oil is constantly supplied to the friction surfaces of the power clutch 12 through a passage 23 in the shaft 11 and the latter passage along with the passages 21 and 22 are tied in with an oil circuit presently described.

When engaged to any extent, the power clutch 12 transmits power through a spider 24 connected to the clutch plate 19 and to an impeller 25 forming part of a hydraulic torque converter 26 which otherwise includes a turbine 27 and a stator 28. The impeller 25, turbine 27 and stator 28 are conventionally related in a toroidal circuit 29 and, for purpose of disclosure only, the converter 26 is shown as being of the single stage, stationary housing type, but these aspects are not important.

The turbine 27 connects through a disk 30 with one end of a turbine shaft 31 whose opposite end is splined for connection with a peripherally toothed, jaw clutch 32 which in FIG. 1 is shown in neutral position. Power up and power down movements of the load are obtained by respectively moving the jaw clutch 32 to the right and left as presently described. Movement to the right engages the jaw clutch 32 with the internally toothed end of an output shaft 34 and movement to the left engages the jaw clutch 32 with an internally toothed portion 35 of a gear 36 that may be journaled on the turbine shaft 31 and forms part of a reverse gear train 37. The latter otherwise includes a gear 38 meshing with the gear 36 and carried by a countershaft 39 on which is also mounted a gear 40 that meshes with an idler gear 41 which in turn meshes with a gear 42 forming a part of or otherwise attached to the output shaft 34.

Also mounted on the output shaft 34 is a brake 43 which includes an annular casing 44 that surrounds the shaft 34 and an annular reaction member 45 extending laterally from and rotating with the output shaft 34. The casing 44 is shiftable axially relative to the shaft 34 and reaction member 45 and is provided with annular end walls 46 and 47 which respectively define with the shaft 34 and reaction member 45 annular chambers 48 and 49.

Positioned within the chamber 48 is a plurality of springs 50 interposed between the reaction member 45 and end wall 46 and which bias the casing 44 towards the right to frictionally engage the end wall 46 with an annular brake plate 51 against an abutment ring 52 fixedly connected to the output shaft 34. The periphery of the brake plate 51 is conventionally toothed for axially movable relation to a similarly toothed stationary part 53.

Release of the brake 43 is determined under selected and controlled conditions by a supply of pressure oil through a passage 54 in the output shaft 34 to the chamber 49, hereinafter termed the release chamber. Oil is also supplied through a passage 55 in the output shaft 34 to the spring chamber 48 to thereby provide in the conventional manner a mass of oil that balances the centrifugal head produced by oil in the release chamber 49. When the brake 43 is released, oil in the spring chamber 48 is relieved as will be presently described by reference to FIG. 2. Cooling oil is constantly supplied to the friction surfaces of the brake 43 through a passage 56 in the output shaft 34 and the latter passage together with the passages 54 and 55 form part of an oil circuit presently described.

Figure 2:
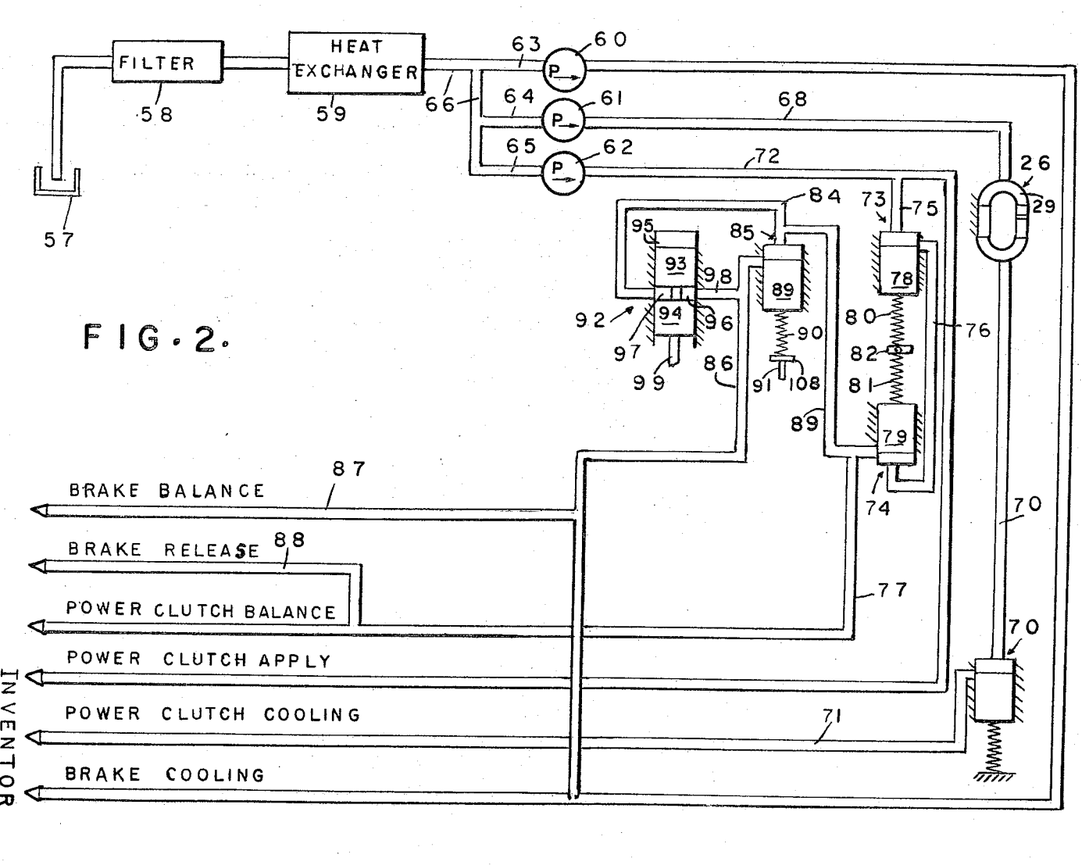
FIG. 2 is a schematic of the oil circuitry for the FIG. 1 transmission with the several parts related to determine the transmission conditioning shown in FIG. 1.

As shown in FIG. 1 and as so far described, the engine is assumed to be running and since the power clutch 12 is released, the jaw clutch 32 is in neutral position and the brake 43 is engaged, the output shaft 34 is at rest so the load is held stationary. For a power up movement, the jaw clutch 32 is shifted to the right to engage the toothed portion 33 and thereafter the power clutch 12 is controllably engaged and the brake 43 is controllably released in relation to each other so that the load may not only be restrained from dropping, if then in an elevated position, but will also be picked up without substantial jerk and smoothly accelerated thereafter, if desired. A part of the oil circuit for effecting this operation is shown in FIG. 2 to which reference will now be made.

The oil is withdrawn from a convenient sump 57 for flow serially through a filter 58 and heat exchanger 59 by means of positive displacement pumps 60, 61 and 62 which are disposed in parallel relation so that their inlets are connected by pipes 63, 64 and 65, respectively, to the outlet pipe 66 of the heat exchanger 59. The outlet of the pump 60 connects through a pipe 67 with the passage 56 (see FIG. 1) to supply a cooling oil flow to the friction elements of the brake 43 and eventual return to the sump 57. The outlet of the pump 61 connects through an inlet pipe 68 with the toroidal circuit 29 to constantly maintain filling of the converter 26 and this circuit connects through an outlet pipe 69 with the inlet of a conventional pressure regulating valve 70 whose outlet connects through a pipe 71 with the passage 23 (see FIG. 1) to supply cooling oil flow to the friction elements of the power clutch 12 and final discharge to the sump 57. The regulating valve 70 maintains a constant working pressure on the oil in the converter 26 that may, for example, be of the order of 60 p.s.i.

From the foregoing, it will be understood that separate pumps 60 and 61 supply the cooling oil flows to the brake 43 and power clutch 12, respectively. The purpose of this arrangement is to insure dissipation of the heat horsepower developed by the brake 43, particularly when a maximum load is lowered at high speeds.

The outlet of the pump 62 connects through a pipe 72 with the passage 21 (see FIG. 1) and hence with the power clutch apply chamber 17 to supply engaging pressure thereto. The pressure in the supply chamber 17 may be varied as desired to provide any torque transmitting condition of the power clutch 12 between zero and maximum values during power up and power down movements of the load by appropriately related and controlled pressure regulating valves 73 and 74, respectively.

Specifically, the inlet of the regulating valve 73 connects by a pipe 75 with the pipe 72 and a pipe 76 connects the outlet of the regulating valve 73 with the inlet of the regulating valve 74 and the outlet of the latter valve connects through a pipe 77 with the passage 22 leading to the balance chamber 18 of the power clutch 12. The regulating valves 73 and 74 include conventional pistons 78 and 79, respectively, which are aligned in the particular arrangement shown, but this relationship is subject to obvious variations. The pistons 78 and 79 are respectively abutted by the adjacent ends of springs 80 and 81 and interposed between the opposed ends of these springs is a push plate 82 whose movement, determined as hereinafter described, in one direction loads the spring 80 to controllably vary the pressure in the pipe 75 and hence in the pipe 72 leading to the apply chamber 17 of the power clutch 12. Movement of the push plate 82 in the opposite direction loads the spring 81 to also vary through the pipe 76, valve 73 and pipe 75 the pressure in the pipe 72 and hence that in the power clutch apply chamber 17.

A pipe 83 connects at one end with the pipe 77 and hence with the outlet of the regulating valve 74 and at the opposite end with a pipe 84, one end of the latter pipe connecting with the inlet of a brake release regulating valve 85. The outlet of the valve 85 connects by a pipe 86 with the pipe 67 and hence with the friction elements of the brake 43 as an additional cooling supply therefor and the pipe 86 also connects through a pipe 87 with the passage 55 (see FIG. 1) leading to the balance chamber 48 of the brake 43. From the foregoing, it will be apparent that when the brake 43 is released, as hereinafter described, and depending upon the extent of the release, a portion of the oil in the balance chamber 48 will be discharged to the brake cooling pipe 67. Pressure oil for the brake release chamber 49 is supplied in the manner presently described by one end of a pipe 88 tapping the pipe 77 while the other end of the pipe 88 connects with the brake release chamber 49 through the passage 54 (see FIG. 1).

The purpose of the brake release regulating valve 85 is to controllably determine through the pipes 84, 83, 77 and 88 the value of the pressure in the brake release chamber 49. This control is infinitely variable to thereby establish whatever resistance is required of the brake 43 between zero and maximum values. To accomplish this result, the valve 85 includes the conventional piston 89, a spring 90 and a pushrod 91 whose movement to load the spring 90 and so vary the brake release pressure is linked to a single lever control as hereinafter described.

With the several parts in the positions shown in FIG. 1, i.e., power clutch 12 released, jaw clutch 32 in neutral and the brake 43 fully engaged, the oil supply to the brake regulating valve 85 is bypassed through the pipe 84 to the inlet of a position valve 92. This valve includes aligned lands 93 and 94 which are simultaneously slidable in a casing 95 and connected by a reduced neck 96 to define between the opposed ends of the lands 93 and 94 an annular chamber 97 with which the discharging end of the pipe 84 then connects. The chamber 97 also then connects through a pipe 98 with the pipe 86 and hence with the sump 57 by way of the brake cooling pipe 67. Actuation of the valve 92 in either direction to deny connection between the pipes 84 and 98 enables regulating control of the brake release valve 85 by the pushrod 91, this shifting of the position valve 92 being effected by a pushrod which is also linked to the single lever control presently described.

The valves in FIG. 2 occupy the several positions determining the release of the power clutch 12 and the full engagement of the brake 43 as shown in FIG. 1. The regulating valves 73 and 74, which are in series flow relation, are fully open so that power clutch engaging pressure is lacking in pipes 75, 72 and 76, and the brake regulating valve 85 is also fully open so that pressure is lacking in the brake release chamber 49 and the brake 43 is fully engaged by the springs 50.

A feature of the invention is the employment of a single lever actuated mechanism for infinitely controlling the pressure regulating valves other than the valve 70 to determine any desired torque transmitting condition of the power clutch 12 and any desired retarding restraint of the brake 43 and, additionally, to accomplish these results independently or simultaneously.

Figures 3, 4:
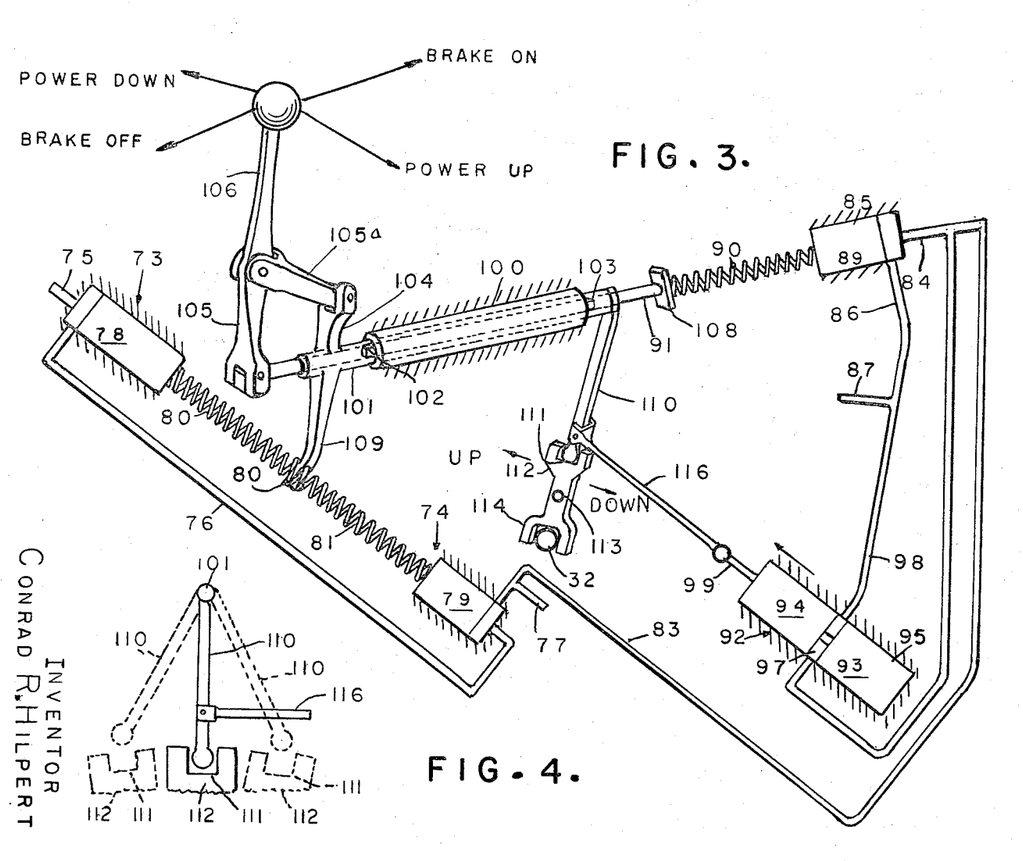
FIG. 3 is a schematic to a somewhat enlarged scale of the single lever control for the FIG. 1 transmission in relation to parts of the oil circuitry as shown in FIG. 2, the lever control portion being shown in isometric view.
FIG. 4 is a fragmentary elevation of the clutch yoke and the associated rock arm, the full line positions being those shown in FIG. 3 and the dotted left and right positions indicating power up and down movements of the load, all respectively.

Referring to FIG. 3, the numeral 100 designates a fixed sleeve in which is journaled a hollow shaft 101 whose ends extend beyond the respective adjacent ends of the sleeve 100. Appropriate bosses 102 and 103 carried by the shaft 101 abut the opposite ends respectively of the sleeve 100 to thereby restrict the shaft 101 to rotative movements only. An arm 104 extends from the upper portion of one end of the shaft 101 for bifurcated pivotal connection with one end of a link 105 whose opposite end has similar connection with an intermediate part of a control lever 106 that may be shaped at one end to provide a handgrip 107. Below the link 105, the control lever 106 is bifurcated to pivotally receive the adjacent end of the pushrod 91 which extends axially completely through and is slidable relative to the shaft 101. The relation of the pushrod 91 to the adjacent end of the control lever 106 is such that a rocking movement of this lever on the link 105 effects longitudinal movements of the pushrod 91. The opposite end of the pushrod 91 may carry a push plate 108 in abutting relation to the adjacent end of the loading spring 90 for the brake release valve 85.

The opposite exposed ends of the shaft 101 respectively have secured thereto rock arms 109 and 110, the free end of the former arm carrying the push plate 82 positioned between and in abutting relation to the adjacent ends of the springs 80 and 81, while the free end of the arm 110 engages the slotted end 111 of a conventional shift yoke 112 that is pivoted at 113. The opposite end of the yoke 112 is bifurcated at 114 to engage an annular channel 115 (see FIG. 1) around and for the purpose of shifting the jaw clutch 32, all in the well known manner. One end of a link 116 is connected to an intermediate part of the rock arm 110 and the opposite end of the link 116 suitably connects with the pushrod 91 as a means of controlling the position valve 92.

In FIG. 3, the control lever 106 occupies a position determining the full release of the power clutch 12, the full engagement of the brake 43 and the neutral position of the jaw clutch 32. Accordingly, the functional relations of the pressure regulating valves 78, 79 and 89 and of the position valve 92 are identical with those shown in FIG. 2.

Further, it will be noted from FIG. 3 that the control lever 106 is capable of universal-like movements with respect to its infinitely variable control on the loading of the springs 80, 81 and 90. This situation stems from the fact that the control lever 106 and its connected shaft 101 may be rocked to an infinite number of positions with attendant modulations of the springs 80 or 81 and of the apply pressure for the power clutch 12, dependent upon the direction of movement, and, further, in any rotated position of the shaft 101, the control lever 106 may be rocked in the plane which it then occupies to determine an infinite number of linear movements of any extent within the permissible range of the pushrod 91 and consequent modulation of the spring 90 and of the restraint provided by the brake 43.

Considering a power up movement of the load with the several parts in the positions shown in FIGS. 1 to 3, inclusive, i.e., power clutch 12 fully released, jaw clutch 32 in neutral and the brake 43 fully engaged, the lever 106 and shaft 101 are rotated clockwise, as viewed in FIG. 3, to cause the arm 109 to begin loading the spring 80 and hence a pressure increase in the apply chamber 17 of the apply clutch 12. Simultaneously with this operation, the arm 110 also rotates clockwise and effects a counterclockwise rocking of the yoke 112 which shifts the jaw clutch 32 to engage the spline portion 33 and thus establish a power up connection with the output shaft 34.

The engagement of the jaw clutch 32 with the spline portion 33 constitutes a stop position of this clutch under the stated condition, but it still may be necessary to further rotate the arm 109 to additionally modulate the spring 80 to establish a selected apply pressure for the power clutch 12. This result is accomplished by the automatic disengagement of the arm 110 from the slot 111 as schematically shown in FIG. 4 in which the full line positions of the arm 110 and yoke 112 correspond to those shown in FIG. 3, the power clutch 12 being released. When the arm 110 is rocked towards the left hand dotted position in FIG. 4, it rocks the upper end of the yoke 112 towards the left hand dotted position as shown in the same figure. While the relationship is shown exaggerated in FIG. 4, it will be understood that when the jaw clutch 32 has moved to the above indicated stop position, the position of the yoke 112 is such that further movement of the arm 109 in the clockwise direction is free of the yoke 112 which remains in its shifted power up position. When the arm 110 is moved from the left dotted position in FIG. 4 toward the full line position, it reengages the slot 111 to again rock the yoke 112.

Coincident with the clockwise rocking of the arm 110 for the purpose stated above and by reason of such rocking, the position valve 92 is shifted to block by means of the land 93 the bypass flow through the pipe 84. The brake release valve 85 is then conditioned for modulation by the spring 90 to begin building pressure in the chamber 49 for the purpose of releasing the brake 43. Modulation of the spring 90 is achieved by rocking the control lever 106 on the link 105 to move the pushrod 91 towards the right as viewed in FIG. 3.

For a characteristic operation and assuming that the load is in its lowermost position, the universal mounting of the control lever 106 enables the brake 43 to be quickly released while the spring 80 is being modulated. It is therefore possible to pick the load up smoothly since the power clutch 12 can be gradually engaged. Considering an intermediate stationary position of the load, i.e., one between a lowermost and upmost position and assuming an up movement from such intermediate position, it will be apparent that the desired mode of operation is to negative the force of gravity so that the load can be started upward without jerk. The control lever 106 provides for this operation because of its capability to so modulate simultaneously the apply pressure to the power clutch 12 and the release pressure to the brake 43 that the load is moved directly upward from the intermediate position without a preliminary dropping of the load. The ability to establish what may be termed a fighting relation between the power clutch 12 and brake 43 is also useful in accurately positioning the load with respect to a floor, for example.

Considering a power down movement of the load from an up position and starting with the power clutch 12 released, the jaw clutch 32 in neutral position and the brake 43 engaged, all as shown in FIG. 1, it will be obvious that a counterclockwise rocking of the control lever 106 will so modulate the spring 81 as to provide whatever power application is required. At the same time, an appropriate release pressure may be applied to the brake 43, if desired, to provide whatever restraint may be necessary on the dropping load.

An important feature of the arrangement is the provision of a safe neutral under a condition where there is a reverse movement of the load as where there is first a power down movement followed by a power up movement. The movement of the control lever 106 during such an operation as noted above causes the position valve 92 to pass through the position shown in FIG. 3 so that the brake release valve 85 is bypassed and the brake 43 is fully engaged to bring the load to a definite stop during the reversal period in which the jaw clutch 32 is moved from a power down to a power up position.

Figure 5:
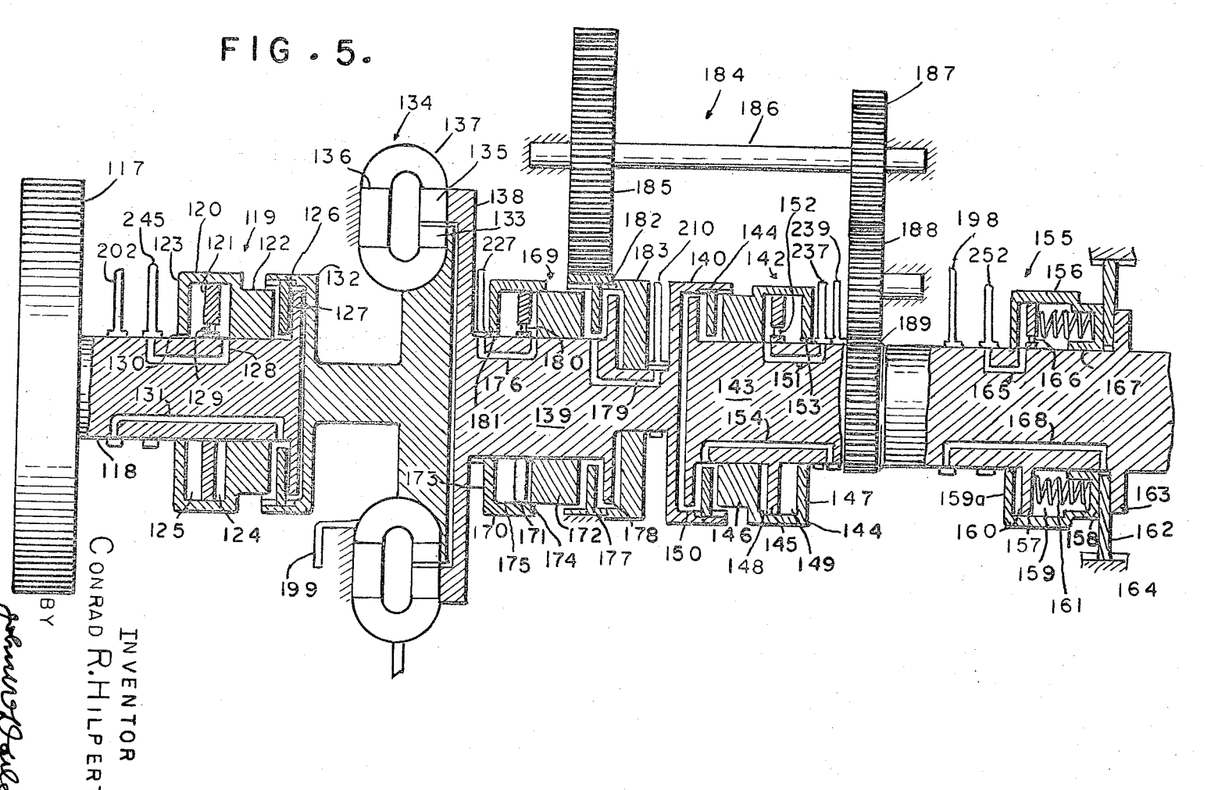
FIG. 5 is a sectional, schematic of transmission modified with respect to FIG. 1 in which controlled slip, hydraulically actuated, friction clutches determine up and down movements of the load, all clutches being released and the transmission being otherwise conditioned to hold the output shaft thereof stationary.
Figure 6:
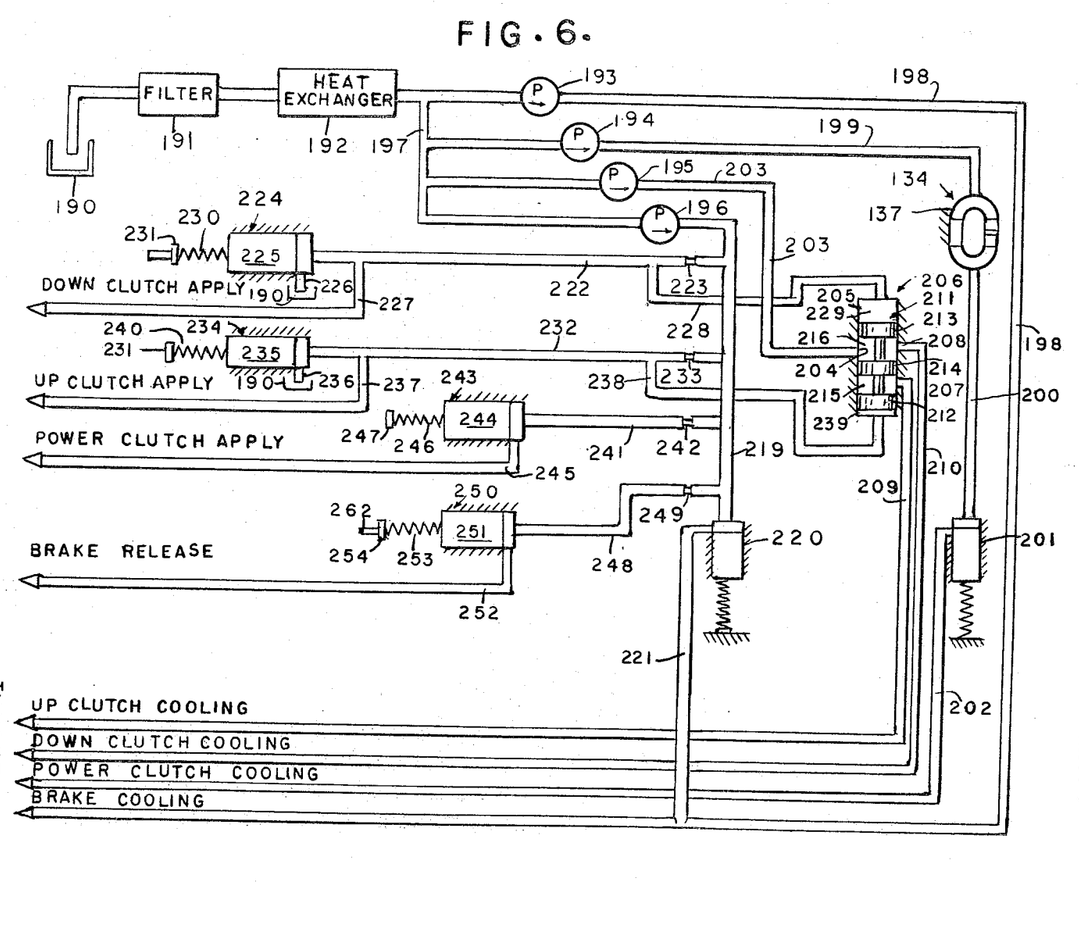
FIG. 6 is a schematic of the oil circuitry for the FIG. 5 transmission and in which the several parts are positioned to determine the transmission conditioning shown in FIG. 5.
Figure 7:
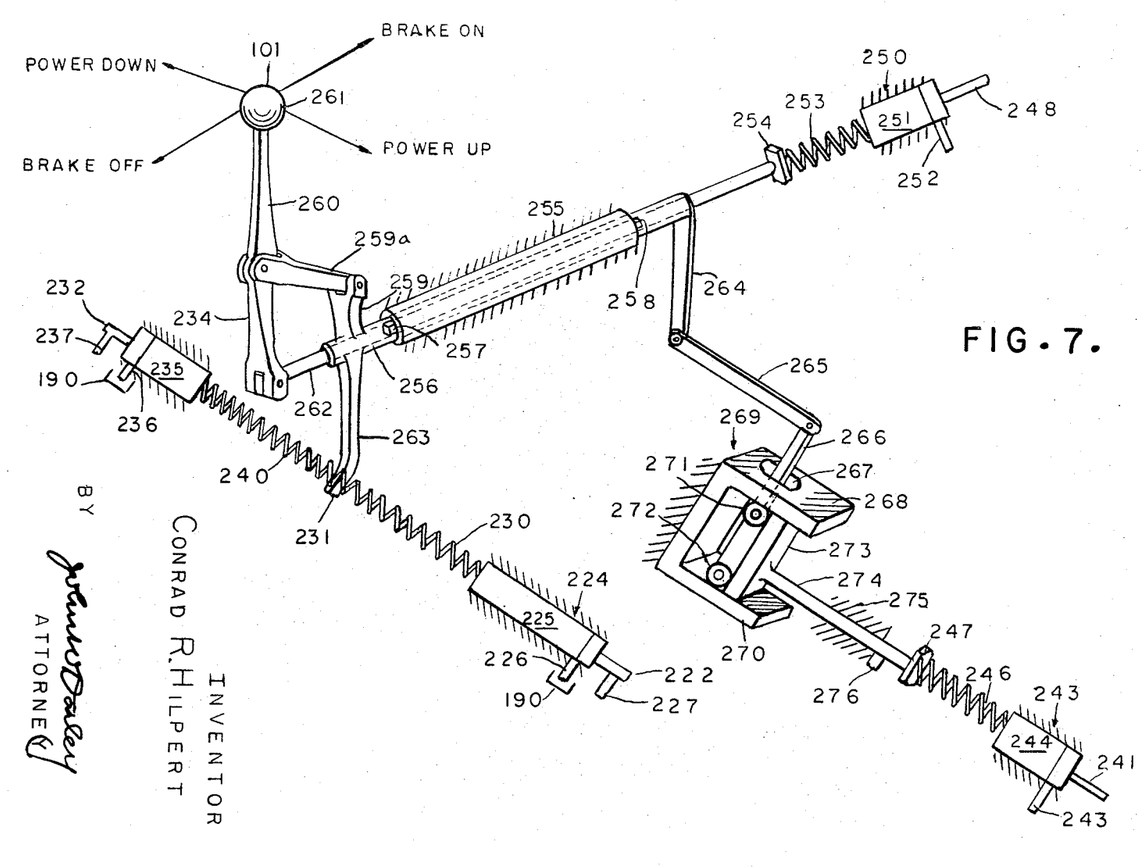
FIG. 7 is an isometric schematic of the single lever control for the FIG. 5 transmission in relation to parts of the oil circuitry as shown in FIG. 6.

In FIGS. 5, 6 and 7 is shown a modified power transmission in which the jaw clutch 32 is replaced by controllable slip, power up and power down clutches which enables a more flexible control including smooth transition from up to down movements and vice versa without passing through a full brake on position, and hydrodynamic braking by means of the converter turbine and relative clutch control.

Referring to FIG. 5, the numeral 117 designates a flywheel as a conventional power source which drivingly connects with an input shaft 118 forming part of an input power clutch 119, hereinafter referred to as the power clutch and shown in release position. The power clutch 119 includes an annular casing 120 that surrounds the shaft 118 and an annular reaction member 121 extending laterally from and rotating with the shaft 118. The casing 120 is shiftable axially relative to the shaft 118 and reaction member 121 and is provided with annular end walls 122 and 123 which respectively define with the shaft 118 and reaction member 121 annular supply and balance chambers 124 and 125.

The transmission circulating oil is supplied under pressure to the apply chamber 124 to shift the casing 120 to the right to frictionally engage the end wall 122 with the driven clutch plate 126 against an abutment 127 fixedly connected to the shaft 118. Clutch engaging pressure oil is supplied to the apply chamber 124 under selected and controlled conditions through a passage 128 in the shaft 118 and oil for the balance chamber 125 is derived from the apply chamber 124 through an orifice 129 in the reaction member 121 and the balance chamber 125 is vented by a conventional relief 130 in the end wall 123. Cooling oil is constantly supplied to the friction surfaces of the clutch 119 through a passage 131 in the shaft 118 and this passage together with the passage 128 are connected with an oil circuit presently described.

The power clutch 119 drives through the clutch plate 126 to a spider 132 that is connected with an impeller 133 forming part of a hydraulic torque converter 134 which also includes a turbine 135 and a stator 136. The impeller 133, turbine 135 and stator 136 are conventionally related in a toroidal circuit 137 and, for purpose of disclosure only, the converter 134 is shown as being of the single stage, stationary housing type, but this aspect is not restrictive.

The turbine 135 connects through a disk 138 with one end of a turbine shaft 139 whose opposite end carries a spider 140 that drivingly connects with a clutch plate 141 forming part of an up clutch 142 that surrounds an output shaft 143. The up clutch 142 includes an annular casing 144 that surrounds an annular reaction member 145 extending laterally from and rotating with the output shaft 143. The casing 144 is shiftable axially relative to the output shaft 143 and reaction member 145 and is provided with annular end walls 146 and 147 which respectively define with the output shaft 143 and reaction member 145 annular apply and balance chambers 148 and 149.

When oil is supplied under pressure to the apply chamber 148, the casing 144 shifts to the left to frictionally engage the end wall 146 with the clutch plate 141 against an annular abutment 150 fixedly attached to the output shaft 143 and so establish a power connection of the latter shaft with the turbine shaft 139. Pressure oil is supplied to the apply chamber 148 through a passage 151 in the output shaft 143 and oil for the balance chamber 149 is supplied from the apply chamber 148 through an orifice 152 in the reaction member 145, the balance chamber 144 being vented by a conventional relief 153 in the end wall 147. Cooling oil is supplied to the friction surfaces of the up clutch 142 through a passage 154 in the output shaft 143 and the passages 151 and 154 are incorporated in an oil circuit presently described.

Also mounted on and surrounding the output shaft 143 is a brake 155 which includes an annular casing 156 that also surrounds an annular reaction member 157 extending laterally from and rotating with the output shaft 143. The casing 156 is shiftable axially relative to the output shaft 143 and reaction member 157 and carries end walls 158 and 159a which respectively define with the output shaft 143 and reaction member 157 annular chambers 159 and 160.

A plurality of springs 161 is positioned within the chamber 159 between the reaction member 157 and end wall 158 for the purpose of biasing the casing towards the right to frictionally engage the end wall 158 with an annular brake plate 162 against an annular abutment 163 attached to the output shaft 143. The brake plate 162 is conventionally toothed for axially movable relation to a similarly toothed stationary part 164, the number of the plates 162 being a matter of choice.

The brake 155 is released under determined and controlled conditions enabling slipping of the brake if required by a supply of pressure oil through a passage 165 in the output shaft 143 to the chamber 160, hereinafter termed the release chamber. Balance oil for the chamber 159 is supplied from the release chamber 160 through an orifice 166 in the reaction member 157, the chamber 159 being vented by a conventional relief 167 in the end wall 158. Cooling oil for the friction surfaces of the brake 155 is constantly supplied through a passage 168 in the output shaft 143, the latter passage and the passage 165 being embodied in an oil circuit presently described.

So far as outlined, the transmission will be conditioned for a power up movement of the load when the power and up clutches 119 and 142, respectively, are engaged and the brake 155 is released. Such movement of the load may be effected by a controlled slip of the clutches 119 and 142 and of the brake 155 to meet varying operating requirements.

Power down load movements are produced by an engagement of a down clutch 169 and the power clutch 119, either full or with a selected slip, the down clutch 169 being mounted on the turbine shaft 139 as also shown in FIG. 5. The down clutch 169 includes an annular casing 170 that surrounds the turbine shaft 139 and also an annular reaction member 171 extending laterally from the latter shaft and rotating therewith. The casing 170 is shiftable axially relative to the turbine shaft 139 and reaction member 171 and carries end walls 172 and 173 which respectively define with the turbine shaft 139 and reaction member 171 apply and balance chambers 174 and 175.

Oil is supplied under pressure through a passage 176 in the turbine shaft 139 to the apply chamber 174 for the purpose of shifting the casing 170 towards the right as viewed in FIG. 5 to frictionally engage the end wall 172 with a driven clutch plate 177 against an annular abutment 178 fixedly carried by the turbine shaft 139. Cooling oil is supplied to the friction elements of the down clutch 169 through a passage 179 in the turbine shaft 139 and the latter passage and the passage 176 form part of an oil circuit presently described. Balance oil for the chamber 175 is supplied from the apply chamber 174 through an orifice 180 in the reaction member 171 and the balance chamber 175 is vented by a conventional relief 181 provided in the end wall 173.

To provide a reverse rotation of the output shaft 143 during down movements of the load, the down clutch plate 177 is axially slidable along and engageable with an internally toothed portion 182 of a gear 183 that may be journaled on the turbine shaft 139 and forms part of a reverse gear train 184. The latter otherwise includes a gear 185 meshing with the gear 183 and carried by a countershaft 186 which also carries a gear 187 that connects through an idler gear 188 with a gear 189 attached to the output shaft 143.

It will be apparent therefore that power down movements of the load are achieved by an engagement of the power and down clutches 119 and 169, respectively, and a release of the up clutch 142 and brake 155 with the same capacity for controlled slip of these components as characterizes up movements.

The oil circuit for the FIG. 5 transmission is schematically shown in FIG. 6 to which reference will now be made.

The oil is withdrawn from a convenient sump 190 for flow serially through a filter 191 and heat exchanger 192 by means of positive displacement pumps 193, 194, 195 and 196 which have parallel flow relation and their inlets connected by a common pipe 197 with the outlet of the heat exchanger 192. The outlet of the pump 193 connects through a pipe 198 with the passage 168 (see FIG. 5) to supply cooling oil to the friction elements of the brake 155 and return to the sump 190. The outlet of the pump 194 connects through an inlet pipe 199 with the toroidal circuit 137 of the converter 134 and this circuit connects through a pipe 200 and a conventional pressure regulating valve 201 with a pipe 202 that communicates through the passage 131 (see FIG. 5) to supply cooling oil to the friction elements of the power clutch 119. The regulating valve 201 maintains a constant working pressure on the oil in the converter 134 except when the power clutch 119 is slipping.

As in FIG. 2, separate pumps 193 and 194 supply cooling oil to the power clutch 119 and brake 155, respectively, to insure adequate heat dissipation when the friction elements of these components are slipping. Additional oil flow to the brake 155 is provided by the pump 196 as presently described.

The outlet of the pump 195 connects through a pipe 203 with an inlet port 204 provided in the casing of a position valve 206. The casing 205 also includes outlet ports 207 and 208 which connect through pipes 209 and 210 with the passages 154 and 179 (see FIG. 5) to supply cooling oil under stated conditions to the friction elements of the up and down clutches 142 and 169, all respectively.

Slidable in the casing 205 is a conventional spool member 211 comprising end lands 212 and 213 and an intermediate land 214 which are connected in the usual manner. The lands 212 and 214 define with the casing 205 a chamber 215 and the lands 213 and 214 define with the casing 205 a chamber 216. The spool member 211 is shown in its lower position by way of example corresponding to a release of at least the up and down clutches 142 and 169, respectively, and an engagement of the brake 155. This lower position of the spool member 211, as well as its upper position presently described, are achieved by means hereinafter set forth. In the lower position of the spool member 211, the port 204 communicates with the chamber 216 and the pipe 210 so that the discharge of the pump 195 is relieved to the friction elements of the down clutch 169.

The outlet of the pump 196 connects successively through a pipe 219, a conventional pressure regulating valve 220 and a pipe 221 with the brake cooling pipe 198. A pipe 222 including an orifice 223 connects at one end with the pipe 219 and at the opposite end with the inlet of a pressure regulating valve 224 having a conventional piston 225 and an outlet 226 connecting with the sump 190. A pipe 227 provides a connection between the pipe 222 anterior to the valve 224 and the passage 176 (see FIG. 5) leading to the apply chamber 174 of the down clutch 169. A pipe 228 connects at one end with the pipe 222 on the discharge side of the orifice 223 and at the opposite end with a chamber 229 included between the upper end of the casing 205 and the land 213. The valve piston 225 is abutted by one end of a spring 230 which may be loaded by a push plate 231. Movement of the push plate 231 towards the right as viewed in FIG. 5, determined as presently described, loads the spring 230 to controllably vary the pressure in the pipe 227 and therefore the pressure in the apply chamber 174 of the down clutch 169 and also the pressure in the pipe 228 leading to the chamber 229.

A pipe 232 including an orifice 233 provides a connection between the pipe 219 and the inlet of a pressure regulating valve 234 having a conventional piston 235 and an outlet 236 connecting with the sump 190. A pipe 237 provides a connection with the pipe 232 anterior to the valve 234 and the passage 151 (See FIG. 5) leading to the apply chamber 148 of the up clutch 142. A pipe 238 connects at one end with the pipe 232 on the discharge side of the orifice 233 and at the opposite end with a chamber 239 included between the lower end of the casing 205 and the land 212. The valve piston 235 is abutted by one end of a spring 240 which may be loaded by the push plate 231. Movement of the push plate 231 towards the right as viewed in FIG. 6 loads the spring 240 to controllably vary the pressure in the pipe 237 and hence the pressure in the apply chamber 148 of the up clutch 142 and also the pressure in the pipe 238 leading to the chamber 239.

For purposes of illustration in FIG. 6, the springs 230 and 240 are shown in side by side relation, but a suggested arrangement enabling control by a single lever mechanism is shown in FIG. 7, hereinafter described, in which these springs are aligned and the push plate 231 is interposed between the opposed ends of the springs.

A pipe 241 including an orifice 242 provides a connection between the pipe 219 and the inlet of a pressure regulating valve 243 having a piston 244. A pipe 245 connects through the valve 243 with the passage 128 (see FIG. 5) and hence with the apply chamber 124 of the power clutch 119. A spring 246 is interposed between one end of the piston 244 and a push plate 247 whose movements controllably determine the pressure in the pipe 245.

A pipe 248 including an orifice 249 provides a connection between the pipe 219 and the inlet of a pressure regulating valve 250 having a piston 251. The outlet of the valve 250 connects by a pipe 252 with the passage 165 (see FIG. 5) and hence with the release chamber 160 of the brake 155. A spring 253 is interposed between one end of the piston 251 and a push plate 254 whose movements controllably determine the pressure in the pipe 252.

With the parts in the several positions shown in FIG. 6 and referring by cross reference to FIG. 5, the up and down clutches 142 and 169 are released, the shown connections of the regulating valves 234 and 224 to the sump 190 through the pipes 236 and 226, all respectively, providing for quick release when required. Further, the power clutch 119 is released and the brake 155 is engaged as permitted by the fully open positions of the regulating valves 243 and 250 in relation to the orifices 129 and 166 (see FIG. 5) and the reliefs 130 and 167, all respectively. Moreover, by reason of the orifices 223, 233, 242 and 249, an oil pressure of a determined value is maintained in the pipe 219 by the regulating valve 220 which is immediately available when apply pressures for selected clutches and release pressure for the brake 155 are required.

The position valve 206 is in its lower position wherein the output of the pump 195 is discharged through the pipes 203 and 210 and chamber 216 to the plates of the down clutch 169. In the relation of parts shown, the position valve 206 merely serves as a relief for the pump 195 since the down clutch 169 is fully released. If the regulating valve 224 is moved to increase the pressure in the apply chamber 174 of the down clutch 169, this pressure increase is also effective through the pipe 228 and in the chamber 229 to maintain the spool member 211 in the shown lower position and the oil then cools the down clutch 169 during its operation.

It will be apparent that if the regulating valve 234 is moved to increase the pressure in the apply chamber 148 to thereby fully or slippingly engage the up clutch 142, this pressure will act through the pipe 238 and the chamber 239 to shift the spool member 211 upward and thus connect the pipes 203 and 209 through the chamber 215 to supply cooling oil to the up clutch 142. Hence, the position valve 206 is always in either the up or down position and shift from one to the other is determined by the selective actuation of the regulating valves 224 and 234.

Modulation of the pressures in the clutch apply chambers 124, 148 and 174 and in the brake release chamber 160 by control of the regulating valves 243, 234, 224 and 250, all respectively, is accomplished by a single lever actuated mechanism like that shown in FIG. 3.

Referring to FIG. 7, the numeral 255 designates a fixed sleeve in which is journaled a hollow shaft 256 whose ends extend beyond the respective adjacent ends of the sleeve 255. Appropriate bosses 257 and 258 carried by the shaft 256 abut the opposite ends of the sleeve 255 to restrict the shaft 256 to movements of rotation only. An arm 259 extends from the upper portion of one end of the shaft 256 for bifurcated pivotal connection with one end of a link 259a whose opposite end has similar connection with an intermediate part of a control lever 260 that may be shaped to provide a handgrip 261 on one end.

Below the link 259a, the control lever 260 is bifurcated to pivotally receive the adjacent end of a pushrod 262 which extends axially through and is slidable relative to the shaft 256 and the relation between the control lever 260 and pushrod 262 is such that, when the control lever 260 is rocked in either direction on the link 259a, the pushrod 262 is longitudinally moved in either direction. The opposite end of the pushrod 262 carries the push plate 254 for modulation of the spring 253.

The opposite exposed ends of the shaft 256 have secured thereto rock arms 263 and 264, the free end of the former arm carrying the push plate 231 which is interposed between and in abutting relation to the adjacent ends of the springs 230 and 240. For drawing convenience, the springs 230 and 240 are shown longer in FIG. 7 than in FIG. 6, but this difference is not significant.

The free end of the rock arm 264 is pivotally connected to one end of a link 265 whose opposite end is pivotally attached to one end of a lever 266 which may extend through a slot 267 in the upper track 268 forming part of a stationary, U-shaped guide member 269 which also includes a lower track 270 that is parallel to the upper track 268. Within the guide member 269, the lever 266 carries rollers 271 and 272 which are generally guided by the inner opposed surfaces of the upper and lower tracks 268 and 270, all respectively.

In the position of the lever 266 shown in FIG. 7, the rollers 271 and 272 abut a plate 273 carried by a rod 274 that is slidable through a guide 275 and affixed to the exposed end of the rod 274 is a push plate 247 whose movements modulate the spring 246 and hence apply pressure on the power clutch 119. The rod 274 may also carry a stop 276 which, in the position of parts shown in FIG. 7, abuts the guide 275 and determines the shown position of the plate 273 in abutting relation to the rollers 271 and 272. With this arrangement, any rocking movement of the control lever 266 will effect a movement of the plate 273. If some lost motion is desired, the stop 276 can be attached to the rod 274 so that with the lever 266 in the position shown in FIG. 7, the plate 273 will be spaced from the rollers 271 and 272. The lever 266 can then be rocked through a determined arc before one or the other of the rollers 271 and 272 will engage the plate 273.

It will be apparent that, when the arm 264 is rocked clockwise in FIG. 7, the roller 271 will be moved away from the plate 273 and the roller 272 will begin to apply pressure to the plate 273 and thereby load the spring 246. A contrary rock of the arm 264 effects bearing of the roller 271 against the plate 273 for the same purpose and a withdrawal of the roller 272.

In FIG. 7, the control lever 260 occupies a position determining the full release of the power, up and down clutches 119, 142 and 169, respectively, and the full engagement of the brake 155. Accordingly, the regulating valves 224, 234, 243 and 250 occupy the same positions in FIG. 7 as in FIG. 6 and the position valve 206 is located as shown in FIG. 6.

From the foregoing, it will be obvious that the control lever 260 is characterized by the same universal-like action as is the control lever 106. Hence, the modulating and selective control of the regulating valves 224, 234, 243 and 250 is comparable to that shown in FIG. 3.

Compared to the transmission shown in FIGS. 1 to 4, that shown in FIGS. 5 to 7 enables a smooth transition from up to down movement and vice versa without passing through the full brake on position. It also provides for hydrodynamic braking through the action of the turbine 135. For example, with the brake 155 fully engaged to hold the load stationary, all clutches released, and considering an up movement of the load, the control lever 260 is moved to controllably release the brake 155 and to controllably engage the up and power clutches 142 and 119, respectively. If down load movement is required with the up and power clutches 142 and 119 engaged and the brake 155 released, the up clutch 142 and the power clutch 119 are controllably released to permit the load to fall against the hydrodynamic restraint provided by the turbine 135 and, if desired, against the added restraint provided by the brake 155. Increased rate of fall is obtained by progressively releasing the up clutch 142 and engaging first the down clutch 169 and then the power clutch 119. Stopping a falling load with the power clutch 119 at least partially released is effected by controllably engaging the up clutch 142 and then the power clutch 119. When the desired load position is attained, the brake 155 is fully engaged and all clutches released.

I claim:

1. For use with apparatus having means for hoisting and lowering a load, a power transmission connectible to a power source and including hoisting and lowering power trains having a common output arranged for connection to the input of the apparatus, the hoisting and lowering power trains having common thereto and in series power flow relation a hydraulically controlled, friction power clutch and a hydraulic torque converter, the lowering power train additionally including a reverse gear whose output is connected to the common output of the power trains and whose input is connectible to the hydraulic torque converter, and clutch means operable to selectively connect the converter directly with the common output for hoisting and the converter with the common output through the reverse gear for lowering.

2. A power transmission as defined in claim 1 wherein the common output carries a brake spring biased to engagingly hold the load in any position and hydraulically actuated for release, and means for determining the engagement of the power clutch and the release of the brake including means for infinitely modulating said engagement and release.

3. A power transmission as defined in claim 1 wherein the power trains are coaxial and the clutch means is constituted by a jaw clutch axially shiftable between positions having toothed engagement with the common output to provide up load movements and like engagement with the input of the reverse gear to provide down load movements.

4. A power transmission as defined in claim 2 wherein control means characterized by a substantially universal movement activates the means for modulating engagement and release of the power clutch and brake, respectively, and has connection with the clutch means to determine said selective engagement thereof.

5. A power transmission as defined in claim 4 wherein a position valve link responsive to movement of the control means determines a full engagement of the brake when the clutch means is shifted from up to down movements of the load and vice versa.

6. A power transmission as defined in claim 4 wherein the power clutch includes an apply chamber and the brake includes a release chamber, both chambers being adapted to receive a liquid under pressure, and the modulating means includes first and second pressure regulating valve pipes connected to the apply chamber and a third pressure regulating valve pipe connected to the release chamber, each valve having a piston and a spring abutting each piston and arranged to be loaded by the control means to respectively regulate the pressures in the apply and release chambers during up and down movements of the load.

7. A power transmission as defined in claim 6 wherein a position valve responsive to movements of the control means determines a full engagement of the brake when the clutch means is shifted from up to down movements of the load and vice versa.

8. A power transmission as defined in claim 1 wherein the clutch means includes separate up and down, hydraulically actuated friction clutches selectively controlled to respectively connect the converter directly with the common output and the converter with the common output through the reverse gear.

9. A power transmission as defined in claim 8 wherein the common output carries a brake spring biased to engagingly hold the load in any position and hydraulically actuated for release, and means for selectively determining the engagement of the power, up and down clutches and the release of the brake including means for infinitely modulating said engagements and release.

10. A power transmission as defined in claim 8 wherein the power trains are coaxial and the converter includes an impeller connected to the output of the power clutch and a turbine, a shaft having its ends respectively connected to the turbine and the input of the up clutch, the up clutch being carried by the common output and the down clutch by the turbine shaft and having its output connected to the input of the reverse gear.

11. A power transmission as defined in claim 9 wherein control means characterized by a substantially universal movement selectively activates the means for modulating engagement of the power, up and down clutches and the release of the brake.

12. A power transmission as defined in claim 11 wherein the up and down clutches are included in an oil circuit for supplying cooling oil to the friction elements thereof and a position valve is included in the oil circuit and is shiftable between positions respectively supplying cooling oil to the up and down clutches when said last named clutches are engaged.

13. A power transmission as defined in claim 9 wherein the power, up and down clutches each include an apply chamber and the brake includes a release chamber, all of said chambers being included in a pressure oil circuit, and the modulating means includes first, second, third and fourth pressure regulating valves embodied in the oil circuit and pipe connected respectively to the apply chambers of the down, up and power clutches and the release chamber of the brake, each valve having a piston and a spring abutting each piston and arranged to be selectively loaded by the control means to respectively regulate the pressures in the apply and release chambers.

14. A power transmission as defined in claim 13 wherein the oil circuit additionally includes provision for supplying cooling oil to the friction elements of the down and up clutches, and a position valve is included in that part of the pressure oil circuit which supplies pressure oil to the down and up clutches, the position valve being shiftable by pressures selectively established in the apply chambers of the down and up clutches between positions determining cooling oil flow to the friction elements of the down and up clutches, respectively.

References Cited
UNITED STATES PATENTS

| | | | |
|---|---|---|---|
| 2,616,311 | 11/1952 | Lapsley | 74—730 |
| 2,699,074 | 1/1955 | Livezey et al. | 192—3.26 X |
| 3,059,504 | 10/1962 | Hill | 74—730 X |
| 3,202,018 | 8/1965 | Hilpert | 192—3.33 X |

MARK NEWMAN, *Primary Examiner.*

A. T. McKEON, *Examiner.*